United States Patent [19]

Keuning

[11] Patent Number: 5,443,720
[45] Date of Patent: Aug. 22, 1995

[54] SANITARY CARTRIDGE FILTER HOUSING

[75] Inventor: Sytze A. Keuning, Saugerties, N.Y.

[73] Assignee: Stavo Industries, Inc., Kingston, N.Y.

[21] Appl. No.: 189,835

[22] Filed: Feb. 1, 1994

[51] Int. Cl.⁶ .............................................. B01D 35/30
[52] U.S. Cl. .................... 210/232; 210/350; 210/437; 210/440; 210/443; 210/450; 210/453
[58] Field of Search ............... 210/232, 350, 351, 435, 210/437, 440, 443, 445, 450, 453, 457

[56] References Cited

U.S. PATENT DOCUMENTS

| | | | |
|---|---|---|---|
| 956,914 | 5/1910 | Ward | 210/278 |
| 2,313,612 | 3/1943 | Alsop | 210/179 |
| 2,325,169 | 7/1943 | Alsop | 210/177 |
| 2,392,354 | 1/1946 | Alsop | 210/181 |
| 2,435,115 | 1/1948 | Alsop | 210/181 |
| 2,655,397 | 10/1953 | Augspurger et al. | 292/256.69 |
| 3,193,129 | 7/1965 | Pflüger et al. | 220/4.16 |
| 3,451,554 | 6/1969 | Wade | 210/278 |
| 4,267,940 | 5/1981 | Wade | 220/321 |
| 4,588,503 | 5/1986 | Sugiura | 210/232 |
| 4,642,182 | 2/1987 | Drori | 210/232 |
| 4,810,379 | 3/1989 | Barrington | 210/232 |
| 4,824,564 | 4/1989 | Edwards et al. | 210/232 |
| 4,853,120 | 8/1989 | Frantz | 210/184 |
| 5,139,686 | 8/1992 | Cares | 210/232 |
| 5,178,753 | 1/1993 | Trabold | 210/130 |
| 5,279,732 | 1/1994 | Edens | 210/232 |

OTHER PUBLICATIONS

Pall Sanlil Housing Data Sheet (H-21), Feb. 1987.
Pall Sane 2 Housing Data sheet (H-25), Feb. 1987.
Alsop Sanitary Filter, Alsop Engineering Company, Bulletin 12-SF.

Primary Examiner—Robert A. Dawson
Assistant Examiner—Robert James Popovics
Attorney, Agent, or Firm—Jacobson, Price, Holman & Stern

[57] ABSTRACT

A sanitary cartridge filter housing is formed by a bottom plate having a raised platform thereon from which a splash plate extends radially. A housing cylinder is mounted on the bottom plate and clamped thereto, with an O-ring therebetween, by a surrounding clamp. At an opposite end of the housing cylinder is located a top plate which is either held in place by a clamp or by the pressure exerted on the top plate by a tightening nut threadingly engaging a winged center post with the threads of the winged center post engaging the tightening nut externally of the formed housing. The winged center post is solid (non-perforated) and extends through the center of the housing cylinder, through the platform supporting the splash plate, and is secured at its lowermost end at the bottom of an outlet port tee located externally of the formed housing.

14 Claims, 2 Drawing Sheets

5,443,720

SANITARY CARTRIDGE FILTER HOUSING

FIELD OF THE INVENTION

This invention relates to sanitary filtering of liquid by pharmaceutical and chemical plants, hospitals, pharmacy colleges, and household product packagers, for example, and others requiring completely sanitary conditions for production of a sanitary product.

BACKGROUND OF THE INVENTION

Many examples of housings for filtration of liquids are known. For example, in U.S. Pat. Nos. 2,313,612, 2,325,169, 2,392,354 and 2,435,115 to Alsop, various filter arrangements are disclosed. These filters interact with a central perforated post through which filtered liquid passes. These filter arrangements are acceptable where contamination of the fluid to be filtered is not critical.

Other examples of differing housings and filtration systems are disclosed in U.S. Pat. No. 956,914 to Ward, U.S. Pat. No. 2,655,397 to Augspurger et al., U.S. Pat. No. 3,193,129 to Pfluger et al., U.S. Pat. No. 4,267,940 to Wade, U.S. Pat. No. 4,588,503 to Sugiura, U.S. Pat. No. 4,853,120 to Frantz, and U.S. Pat. No. 5,178,753 to Trabold.

U.S. Pat. No. 956,914 discloses a method and apparatus for controlling and cleaning self-cleansing granular bed filters intended primarily for use in filtering water. Opposite ends of a filter casing are accessible by removal of bolts from a series of connected sections.

U.S. Pat. No. 2,655,397 discloses tank closure fasteners designed and adapted for use on top closures for rental-type water softeners.

U.S. Pat. No. 3,193,129 discloses a pressure container which consists of a plurality of individual sections, and which may be assembled from as many sections as are needed to form a cavity of desired volume by opening and closing a clamp fastener.

U.S. Pat. No. 4,267,940 discloses a connector which cannot be removed from parts or sections interconnected by the connector while such parts are displaced, as by pressure, relatively away from one another.

U.S. Pat. No. 4,588,503 discloses a liquid filter assembly for removing impurities contained in a liquid including a roll filter disposed within a casing.

U.S. Pat. No. 4,853,120 discloses a device for filtering fluids such as lubricating and fuel oils.

U.S. Pat. No. 5,178,753 discloses an oil filter for internal combustion engines.

An example of a sanitary filter housing for use with cartridge filters is available from Alsop Engineering Company as Model 12-SF. This sanitary filter housing includes a bottom plate to which is clamped a single, integral piece cover by a plurality of spaced-apart bolts. The bolts each pass through an L-shape fastener which grips a lip at the bottom of the cover as the bolts are tightened.

SUMMARY OF THE INVENTION

By the present invention, a sanitary cartridge filter housing is formed by a bottom plate having a raised platform thereon from which a splash plate extends radially. A housing cylinder is mounted on the bottom plate and clamped thereto, with an O-ring therebetween, by a surrounding clamp. At an opposite end of the housing cylinder is located a top plate which is either held in place by a clamp or by the pressure exerted on the top plate by a tightening nut threadingly engaging a winged center post with the threads of the winged center post engaging the tightening nut externally of the formed housing. The winged center post is solid (non-perforated) and extends through the center of the housing cylinder, through the platform supporting the splash plate, and is secured at its lowermost end at the bottom of an outlet port tee located externally of the formed housing.

The cavity formed by the filter housing, and all sanitary fittings, as well as any other part which comes into contact with the liquid to be filtered, are made from 316 stainless steel. There are no exposed threads or crevices within which contaminants may be lodged within the cavity formed by the housing. The filter housing disassembles into a bottom plate, a housing cylinder and a top plate with all interior surfaces of the component parts being sterilizable so that no contamination is passed to a liquid being filtered.

By the present invention it is possible to locate a tightening nut and a tightening handle exteriorly of the sanitary housing. Further, a center post passes through opposite ends of the housing so that the post is anchored at one end in an outlet tee of an outlet port below the bottom of the housing and at an opposite end threadingly engaging the tightening nut above the top of the housing. Upon disassembly of the sanitary housing, all surfaces forming the interior of the housing are easily accessible for sanitary cleaning.

It is therefore an object of the present invention to provide a sanitary filter housing made up of a bottom plate, a housing cylinder and a top plate of three separate components secured together to form an interior sanitary filtration cavity.

It is yet another object of the present invention to provide a sanitary filter housing made up of a bottom plate, a housing cylinder and a top plate of three separate components secured together to form an interior sanitary filtration cavity with a center post extending through the top plate and the bottom post.

It is yet another object of the present invention to provide a sanitary filter housing made up of a bottom plate, a housing cylinder and a top plate of three separate components secured together to form an interior sanitary filtration cavity with a center post extending through the top plate and the bottom plate with one end of the center plate anchored within a tee connection secured to an outlet port of the housing.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
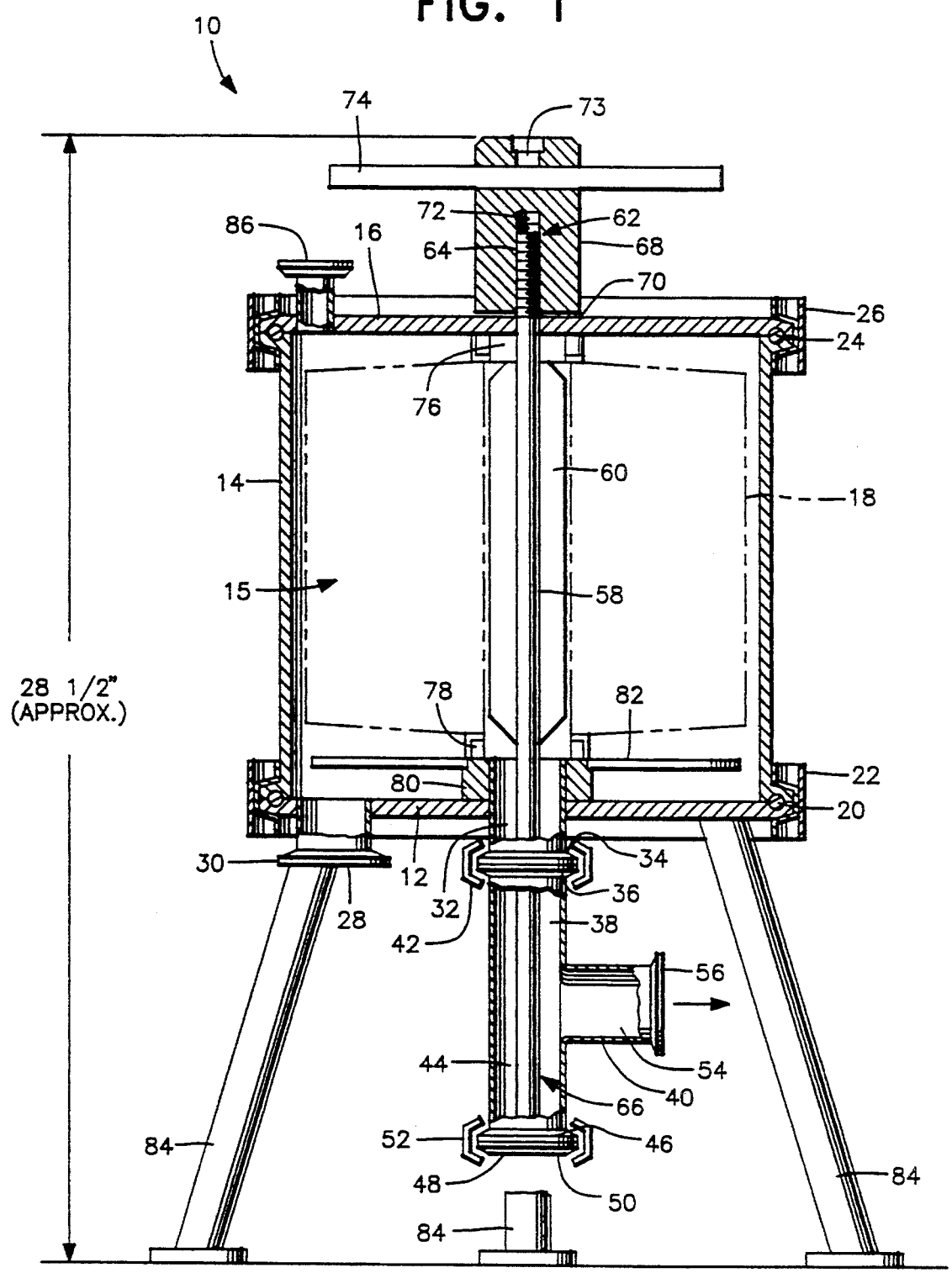
FIG. 1 is a cross-sectional view of a sanitary cartridge filter housing.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIG. 1, in particular, a sanitary cartridge filter housing embodying the teachings of the subject invention is generally designated as 10. With reference to its orientation in FIG. 1, the sanitary cartridge filter housing includes a bottom plate 12, a twelve-inch diameter housing cylinder 14, and a top plate 16. Within a cavity 15 formed by the bottom plate, housing cylinder and top plate is a cartridge filter 18, shown in dotted lines for illustrative purposes only.

Interposed between the bottom plate 12 and the housing cylinder 14 is an O-ring gasket 20 located within semi-circular grooves respectively formed in the bottom plate and a bottom of the housing cylinder. A twelve-inch circular clamp 22 surrounds the junction between the bottom of the housing cylinder 14 and the bottom plate 12 so as to secure the housing cylinder and bottom plate together in a fluid-tight manner.

Similarly, the junction between the top of the housing cylinder 14 and the top plate 16 includes a gasket 24 located within semi-circular grooves formed in the top of the housing cylinder and the top plate. A twelve-inch clamp 26 surrounds the top of the housing cylinder and the top plate to clamp the top plate and housing cylinder in a fluid-tight clamping.

Extending through the bottom plate 12 is an inlet port 28 for introduction of to be filtered liquid into the cavity 15 of the housing 10. The port is of a two-inch diameter having a peripheral flange 30 to which can be secured an inlet pipe for transfer of liquid into the housing.

An outlet opening or port 32 also extends through the bottom plate for passage of filtered liquid. The filtered liquid flows from a central cavity of the cartridge filter 18 which is sealingly connected with outlet opening 32.

A peripheral flange 34 of the outlet port 32 is mated with a peripheral flange 36 of one portion 38 of an outlet tee 40. Peripheral flanges 34 and 36 are secured together by a clamp 42. At an opposite section 44 of tee 40 from section 38, a peripheral flange section 46 is secured to a peripheral flange 48 of a sealing cap 50 by a clamp 52. The sole remaining section 54 of the tee 40 includes a peripheral flange 56 to which is secured an outlet pipe (not shown) for transfer of filtered liquid from the housing 10.

A solid, non-perforated center post 58 includes three radially-extending vanes 60 for positioning of the filter cartridge 18. One end 62 of the center post 58 extends through the top plate 16 and includes a threaded portion 64 located above the top plate 16. The threads of threaded portion 16 are of a sanitary thread construction, which is a square-cut thread as opposed to traditional V-cut threads. The opposite end 66 of the center post 58 passes through a center of the outlet opening 32 and is welded to the closure cap 50 within section 44 of the tee 40.

Mounted above the top plate 16 is a tightening nut 68 having a gasket 70 located between the bottom of the tightening nut and the top of the top plate 16. A central bore 72 of the tightening nut 68 is threaded for matingly engaging with the threaded end 64 of the center post 58. A tightening handle 74 extends through the tightening nut 68 and is held in place by set screw 73. The nut is turned so as to move the center post in an upward direction as the handle 74 is turned. The turning of nut 68 exerts pressure on the flange 34 and therefore between the bottom plate and the bottom of the housing cylinder 14 and between the top plate and the top of the housing cylinder 14 as caused by the retention of the bottom end 66 of the center post on closure cap 50.

As the tightening nut 68 compresses the top and bottom plates against the housing cylinder, gaskets 76 and 78, forming part of the cartridge filter 18, are compressed respectively against the top plate 16 and an extension platform 80 secured to the top of the bottom plate 12. The extension platform 80 includes a central opening forming the outlet 32 for passage of filtered liquid through the cartridge filter 18 into the outlet 32. Extending radially from the extension platform 80 is a splash plate 82.

Extending from a bottom of the bottom plate are three legs 84 which elevate the top of the tightening nut to a height of approximately $28\frac{1}{2}$ inches. Extending through the top plate 16 is a one-inch diameter port 86 which is capped when not in use.

In operation, gasket 20 is positioned between bottom plate 12 and the bottom of housing cylinder 14. Then a gasket 24 is positioned between the top of the housing cylinder 14 and the top plate 16. Tightening nut 68 is then turned on upper end 62 of center post 58 by tightening handle 74 as secured in place by set screw 73 so as to compress gaskets 20 and 24 as well as gaskets 76 and 78 of the cartridge filter 18. The bottom plate and top plate are then each clamped to the housing cylinder 14.

A fluid-tight cavity 15 is thereby formed within the interior of the housing 10 for passage of fluid through inlet port 28 under pressure so that the fluid passes through the filter material of cartridge filter 18 before reaching a centrally-positioned outlet which feeds filtered liquid by gravity into outlet 32. The filtered fluid is then allowed to pass out through section 54 of tee 40.

Upon unthreading of tightening nut 68 off of end 62 of center post 58, the top plate 16 is removed from the housing cylinder 14 and the housing cylinder 14 is removed from the bottom plate 12. All surfaces of the top plate, housing cylinder and bottom plate which normally form the walls of the cavity 15 of the housing 10 can be sterilized due to their smooth surfaces and the material from which these components are made. These three components have no threaded sections or crevices for retention of contaminants. By this assembly, all potential contact of liquid product with unsanitary conditions has been eliminated.

Figure 2:
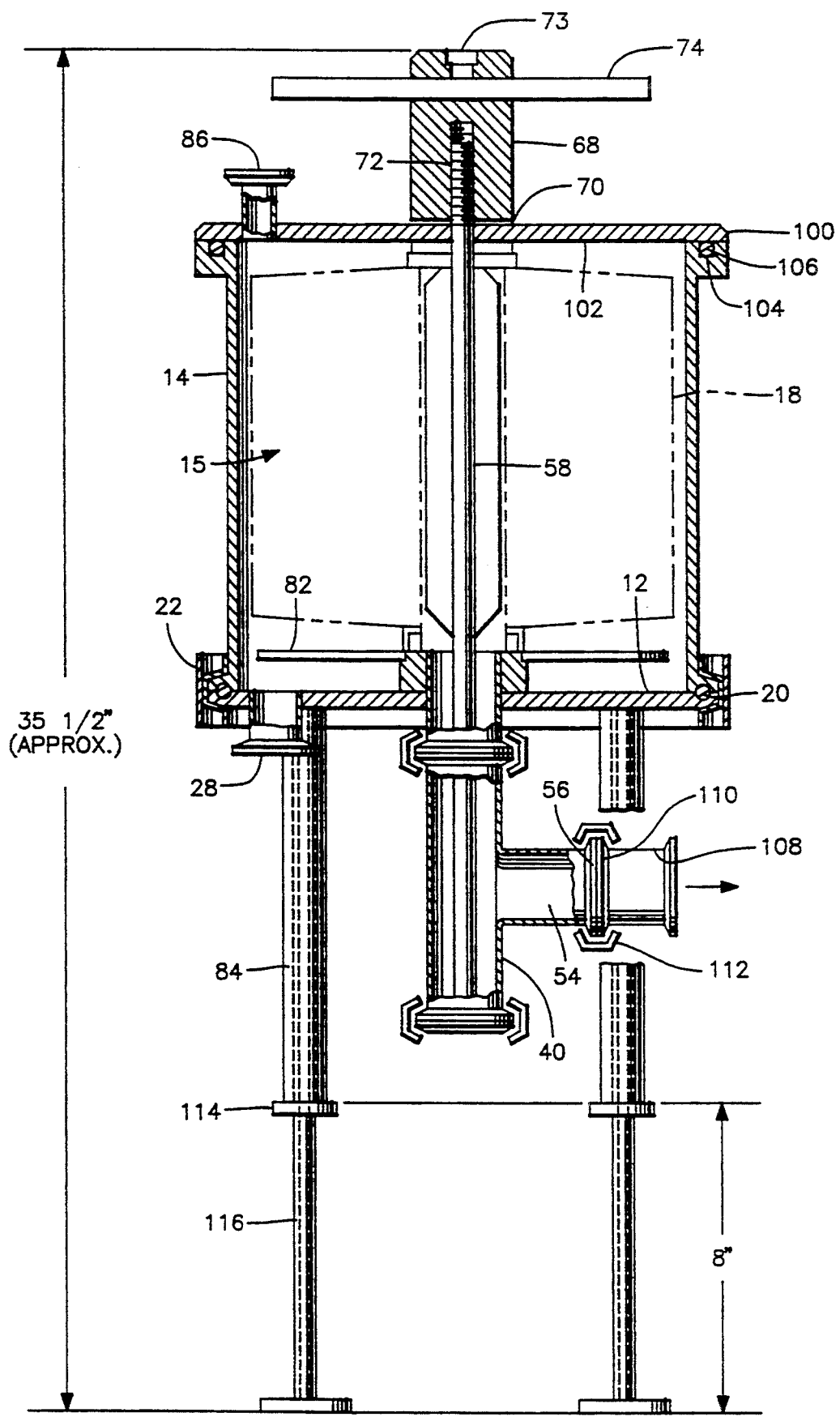
FIG. 2 is a cross-sectional view of an alternative embodiment of a sanitary cartridge filter housing.

In FIG. 2, reference numerals from FIG. 1 are used to identify identical parts. The primary distinction from the FIG. 1 embodiment is that in FIG. 2, the top plate 100 includes a flat interior surface 102 which rests upon a rectangular shape groove 104 located at the top of the housing cylinder 14 and which includes an O-ring gasket 106 which is compressed upon the tightening of the tightening nut 68.

At the section 54 of the tee 40 is secured an exemplary 2" to a $1\frac{1}{2}$" pipe reducer 108 having a peripheral flange 110 connected by clamp 112 to peripheral flange 56 of section 54. In addition, legs 84 include a locking nut 114 for adjusting the height of adjustable leg portions 116 to an 8" maximum height. An overall height of approximately $35\frac{1}{2}$" is thereby possible.

Having described the invention, many modifications thereto will become apparent to those skilled in the art to which it pertains without deviation from the spirit of the invention as defined by the scope of the appended claims.

I claim:

1. A filter housing comprising:
   a bottom plate,
   a top plate,
   a cylindrical wall member extending between said bottom plate and said top plate,
   said bottom plate, said top plate and said cylindrical wall member defining a fluid tight cavity having a cavity inlet,
   an outlet opening formed in said bottom plate,
   a central post extending through said top plate and into said outlet opening for supporting a filter element, and
   means for securing said bottom plate, said top plate and said cylindrical wall member together to form said liquid tight cavity for transfer of liquid from said cavity to said outlet opening,
   said means for securing including a threaded end of said central post extending above said top plate and externally of said liquid tight cavity.

2. A filter housing as claimed in claim 1, wherein said means for securing includes another end of said post opposite to said threaded end terminating below said bottom plate within a T-shaped pipe.

3. A filter housing as claimed in claim 2, wherein said another end of said post is secured to a cap sealing one section of said T-shaped pipe.

4. A filter housing as claimed in claim 1, wherein said means for securing includes a nut threaded onto said threaded end of said post.

5. A filter housing as claimed in claim 1, wherein said top plate, said bottom plate and said cylindrical wall member are made of stainless steel.

6. A filter housing as claimed in claim 1, wherein said post is solid.

7. A filter housing assembly for sanitary filtering of liquids, said filter housing comprising:
   a bottom plate having an outlet opening,
   a top plate having a post opening,
   a cylindrical wall member secured to said bottom plate and said top plate in a liquid tight manner to form a filter cavity having a cavity inlet,
   a central post extending through said post opening and into said outlet opening to secure said cylindrical wall member, said bottom plate and said top plate in said liquid tight manner, a threaded end of said central post extending above said top plate and externally of said filter cavity, and
   filter means having a central opening being mounted on said central post for sealingly engaging said top plate around said post opening and sealingly engaging said bottom plate about said outlet opening for passage of liquid through said filter means to said outlet opening.

8. A filter housing assembly as claimed in claim 7, wherein another end of said post opposite to said threaded end terminates below said bottom plate within a pipe connected to said outlet opening.

9. A filter housing assembly as claimed in claim 8, wherein said threaded end of said post is secured within said pipe connected to said outlet opening.

10. A filter housing assembly as claimed in claim 7, wherein a nut is threaded onto said threaded end of said post.

11. A filter housing assembly as claimed in claim 7, wherein said post is solid.

12. A filter housing assembly as claimed in claim 7, wherein said top plate, said bottom plate and said cylindrical wall member are made of stainless steel.

13. A filter housing assembly as claimed in claim 7, wherein said post is of a lesser width than said outlet opening.

14. A filter housing assembly as claimed in claim 7, wherein said post includes means for positioning said filter means.

* * * * *